United States Patent

[11] 3,572,741

| [72] | Inventor | Nelson E. Shorrock |
| --- | --- | --- |
| | | R. R. #1 S3 B-7, Dryden, Ontario, Canada |
| [21] | Appl. No. | 807,833 |
| [22] | Filed | Mar. 17, 1969 |
| [45] | Patented | Mar. 30, 1971 |

[54] SKI MOUNTINGS FOR POWER TOBOGGANS AND THE LIKE
1 Claim, 4 Drawing Figs.

[52] U.S. Cl. ................................................. 280/26, 267/136, 280/27
[51] Int. Cl. ................................................. B62b 17/04
[50] Field of Search ........................................ 280/15, 16, 17, 21, 22, 24, 25, 26, 27; 180/5, 5 (A); 267/133, 136, 166

[56] References Cited
UNITED STATES PATENTS

| 428,845 | 5/1890 | Legreid | 280/26 |
| --- | --- | --- | --- |
| 493,185 | 3/1893 | Russell | 280/25 |
| 544,221 | 8/1895 | Gould | 280/26 |
| 1,489,086 | 4/1924 | McIlroy | 280/25 |
| 2,700,427 | 1/1955 | Schomers | 280/25X |

FOREIGN PATENTS

| 1,039,069 | 5/1953 | France | 280/25 |
| --- | --- | --- | --- |

*Primary Examiner*—Benjamin Hersh
*Assistant Examiner*—Leslie J. Paperner
*Attorney*—Kent & Ade ABSTRACT: A ski mounting for power toboggans which includes a transverse pivot attached and check or shock absorber springs fore and aft of the pivot between the ski of the body frame.

PATENTED MAR 30 1971    3,572,741

INVENTOR
NELSON D SHORROCK
BY
ATTORNEY

SKI MOUNTINGS FOR POWER TOBOGGANS AND THE LIKE

This invention relates to new and useful improvements in the mounting of sled runners of skis on power toboggans or on sleds being hauled by power toboggans or the like.

Such skis are usually mounted upon brackets secured to the underside of the power toboggan or sled and loss of control is often experienced when travelling at relatively high speeds or over rough ice or snow due to considerable bounce or chatter. This is particularly noticeable when cornering.

My invention overcomes these disadvantages by permitting the ski runner to remain in contact with the surface at all times thus giving greater control and a smoother ride.

I accomplish this by mounting the skis pivotally and adding shock absorber or check springs between the ski of the body frame.

The device is easily adapted for use with existing skis whether on sleds or power toboggans and is economical in manufacture.

In summary I have provided a transverse pivotal attachment of skis to vehicles and added check springs or shock absorbers to control this pivotal movement thus giving a flexible mounting which eliminates chatter or hammering at high speeds and/or over rough ground.

With the foregoing considerations in view, and such other objects, purposes or advantages as may become apparent from consideration of this disclosure and specification, the present invention consists of the inventive concept exhibited in the method, process, construction, arrangement of parts, or new use of any of the foregoing herein particularly exemplified in one or more specific embodiments of such concept, reference being had to the accompanying FIGS. in which.

In the drawings like characters of reference indicate corresponding parts in the different FIGS.

Figure 1:
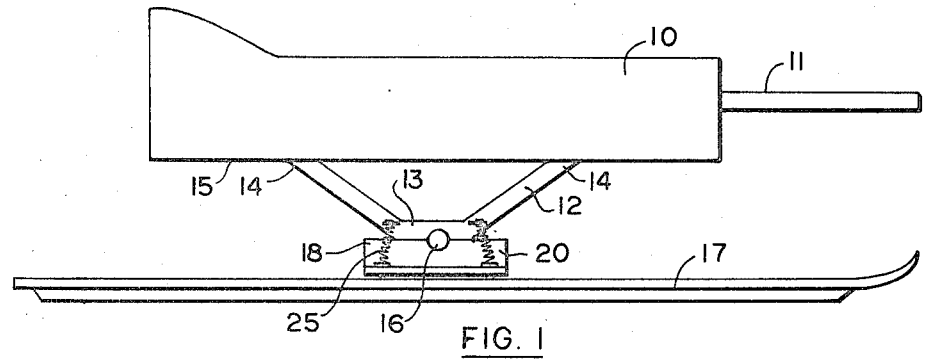
FIG. 1 is a side elevation of a sled showing a ski mounted with my device.
Figure 2:
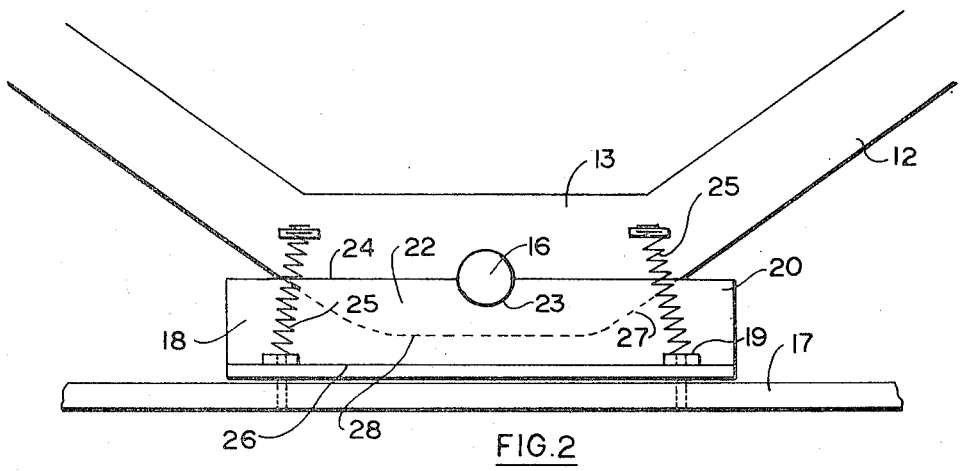
FIG. 2 is an enlarged view showing the attachment of the ski.
Figure 4:
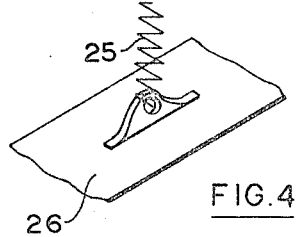
FIG. 4 is an enlarged view of the attachment of the spring.
Figure 3:
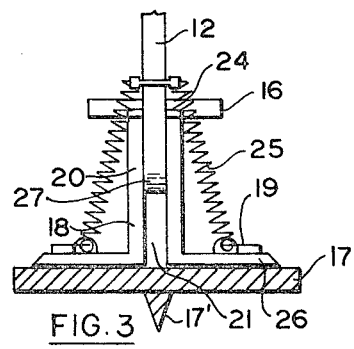
FIG. 3 is an end view of FIG. 2.

Proceeding therefore to describe the invention in detail, reference character 10 illustrates a sled having a tow bar 11. However, the same method of attachment can be used for a power toboggan and it is to be understood that the claims cover the attachment of a ski connection to any form of vehicle.

Downwardly and inwardly converging legs 12 meet at a horizontal base 13 thus forming an attachment bracket, the upper ends 14 of the legs being secured to the underside 15 of the sled or power toboggan.

A shaft or spindle 16 extends transversely through an aperture within the base member 13, said spindle or shaft extending at right angles upon either side thereof.

The ski runner 17 is conventional in construction and usually includes the relatively shallow keel 17 upon the underside.

I mount a pair of spaced and parallel angle irons 18 upon the upper surface of the ski as by bolts 19, the vertical flanges 20 of the angle irons being in spaced and parallel relationship as indicated at 21.

The portion 22 of the base 13 engages between these vertical flanges 20 so that the shaft or spindle 16 rests within semicircular cutouts 23 formed in the upper edges 24 of the angle iron vertical flanges 20. The clearance between the portion 22 and the inner surfaces of the vertical flanges 20 is minimized so that sideway support is provided.

This allows the ski 17 to rock or pivot in a vertical plane parallel to the longitudinal axis thereof. I secure tension springs 25 between the base 13 and the horizontal flanges 26 of the angle irons, said springs being secured in the conventional manner. I prefer that springs are provided both in front and behind the shaft or spindle 16 thus limiting the amount of vertical pivoting action of the ski relative to the base member 13 and thus acting as check springs or shock absorbers.

It should be noted that the corners 27 of the bottom edge 28 of the base 13 are relieved or rounded off to control and limit this movement also, it being understood that this base edge 28 is spaced upwardly from the upper surface of the ski runner.

The springs 25 hold the ski firm if it is lifted off of the snow surface but let the ski move freely when travelling over rough ground. This eliminates any quiver or shake at the point of the skis and is adaptable to all makes of power toboggans or sleds.

I claim:

1. A spring-biased rockable runner mount for sleds and the like, comprising in combination a runner, a pair of transversely spaced parallel angle bars having horizontal flanges secured to the upper surface of said runner and vertical flanges projecting upwardly therefrom, a sled support having a horizontally elongated base portion disposed between the vertical flanges of said angle bars, a transverse fulcrum pin provided in said base portion of said sled support and projecting laterally to both sides thereof, the end portions of said pin being removably and rockably seated in semicircular notches formed in upper edges of said vertical flanges, and pairs of tension springs disposed at the opposite sides of said vertical flanges forwardly and rearwardly of said fulcrum pin, said springs having lower ends anchored to said horizontal flanges and upper ends anchored to said base portion of said support forwardly and rearwardly of said pin, the mount being further characterized in that end portions of said base portion of said support are engageable with said runner to limit the extent of rocking movement of the runner about the axis of said fulcrum pin.